United States Patent Office 2,867,553
Patented Jan. 6, 1959

---

2,867,553

CURING ORGANOPOLYSILOXANES WITH SULPHUR DICHLORIDE

Frank M. Precopio, Erie, Pa., assignor to General Electric Company, a corporation of New York No Drawing. Application April 13, 1956
Serial No. 577,925

8 Claims. (Cl. 117—232)

This invention relates to cured organopolysiloxanes and to the process of producing same. More particularly, this invention relates to a rapid process for curing organopolysiloxanes which comprises treating an organopolysiloxane with a sulfur dihalide such as sulfur dichloride ($SCl_2$), and to the products so formed.

Heretofore, organopolysiloxanes have been cured by many methods, for example by the curing action of various free radical agents, such as peroxides, etc. Although these processes are satisfactory, it is highly desirable to cure organopolysiloxanes with an inexpensive chemical agent that will cure organopolysiloxanes very rapidly without the application of heat.

I have now discovered that organopolysiloxanes can be cured by a rapid, low temperature method which comprises treating an organopolysiloxane with a sulfur dihalide such as $SCl_2$. The versatility of this curing agent is demonstrated by the fact that it can cure both saturated and unsaturated organopolysiloxanes. Since organopolysiloxanes can be cured very rapidly (in less than a minute at room temperature) this invention is very attractive to commercial production. This "short cure" method is particularly useful in curing organopolysiloxanes of such cross-section that they can be exposed to vapors of $SCl_2$ and cured almost instantly.

In general, the process is carried out by exposing the organopolysiloxane to either liquid $SCl_2$ or its vapors. For example, when wire coated with an organopolysiloxane is passed through a tower containing an $SCl_2$ atmosphere, the coating contained thereon is cured within less than a minute. Thereupon, any residual $SCl_2$ is easily removed by exposing the cured organopolysiloxane to a stream of air or an inert gas. In this way an organopolysiloxane insulated wire is produced rapidly without heat.

Unexpectedly, I have discovered that $SCl_2$ is effective in curing both saturated and unsaturated organopolysiloxanes. Thus, it is effective in curing such unsaturated organopolysiloxanes as vinyl, allyl, methallyl, etc. organopolysiloxanes as well as alkyl polysiloxanes such as polydimethylsiloxane, etc.

The curing action appears due to the unexpected versatile chemical reactivity of $SCl_2$. In the case of the unsaturated organopolysiloxanes, it is possible that sulfur dichloride adds at the point of unsaturation so as to cross-link the organopolysiloxane. Yet, even if there are no unsaturated groups present, it appears that sulfur dichloride replaces a hydrogen atom contained on the hydrocarbon moiety of the organopolysiloxane. It appears that the reaction with the unsaturated group is more rapid than the saturated group. However, curing in both cases is very fast, fifteen seconds or less with the unsaturated organopolysiloxane and thirty seconds or less with the saturated organopolysiloxane. In the case where the organopolysiloxane contains Si—H or SiOH groups, reaction will also take place at this point. However, longer times can be used if desired, particularly where a material of thicker cross section is employed.

Since $SCl_2$ is capable of reacting by both addition and substitution, any organopolysiloxane capable of reacting by either of these mechanisms can be used. Thus, organopolysiloxane oils, organopolysiloxane rubbers, and organopolysiloxane resins can be employed. Examples of these organopolysiloxanes can be found in Rochow, Chemistry of Silicones, chap. 6, pp. 78–107, 2nd ed. (1951).

Thus, organopolysiloxanes having the average structural formula

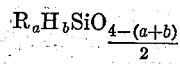

$$R_a H_b SiO_{\frac{4-(a+b)}{2}}$$

where the sum of $a+b=1$ to 3 and $b$ has a value of from 0 to 1 may be employed. In this formula R represents saturated or unsaturated radicals selected from the group consisting of alkyl radical (e. g., methyl, ethyl, propyl, butyl, isobutyl, amyl, hexyl, etc.), aryl radical (e. g., phenyl, diphenyl, naphthyl, anthracyl, tolyl, xylyl, ethylphenyl, etc.), haloaryl (e. g., chlorophenyl, fluorophenyl, etc.), aralkyl radical (e. g., benzyl, phenylethyl, etc.), a cycloalkyl radical (e. g., cyclopentyl, cyclohexyl, etc.), an unsaturated cycloaliphatic hydrocarbon radical (e. g., cyclopentenyl, cyclohexenyl, cyclopentadienyl, etc.), unsaturated aliphatic hydrocarbon radical (e. g., vinyl, allyl, methallyl, ethinyl, butadienyl, etc.), and mixtures thereof. The presence of halogens, for example, chlorine, fluorine, etc., on the organic radicals, particularly on the aryl radicals, is not precluded. Preferably R is methyl, vinyl or phenyl radical. Obviously, it will be apparent to those skilled in the art that different types of organic radicals may be attached to the same silicon atom or may be present in the organopolysiloxane molecule, as, for instance, both methyl and phenyl radicals, both methyl and ethyl radicals, both ethyl and phenyl radicals, etc.

Examples of organohydrogen polysiloxanes may be found, for instance, in Sauer Patents 2,595,890 and 2,595,891; in Wilcock Patent 2,491,843 and in Barry Patent 2,590,812.

Examples of organopolysiloxane oils can be found for example, in Patnode Patent 2,469,888 and in the Rochow text cited above.

Examples of organopolysiloxane gums can be found for example, in Agens 2,448,756; Sprung Patents 2,448,556, 2,484,595; Krieble 2,457,688; Hyde 2,490,357; Marsden 2,521,528 and Warrick 2,541,137, etc.

Examples of resins can be found for instance in Rochow Patents 2,258,218, 2,258,222; Welsh 2,449,572; Bass 2,428,608, 2,446,177, etc. Even though these resins are already cross-linked, they may be further reacted with $SCl_2$ since they contain replaceable hydrogen atoms. For example, the resins can be dissolved in a solvent, applied to a surface of the solvent evaporated therefrom, and thereupon treated with $SCl_2$.

Examples of unsaturated organopolysiloxanes for example are those disclosed in Roedel 2,420,911, Marsden 2,445,794, Hurd 2,645,628, etc.

In order that those skilled in the art may better understand how the present invention may be practiced, the following examples are given by way of illustration and not by way of limitation. All parts are by weight.

EXAMPLE 1

This example describes the preparation of low molecular weight organopolysiloxanes containing silicon bonded vinyl radicals. A mixture of 1000 grams (6.2 moles) of redistilled methylvinyldiethoxysilane (boiling point 133° C. at 1.0 atmosphere, refractive index $n_D^{20} 1.4001$, density $d_4^{20} 0.8620$) and 1000 ml. of 6 Normal hydrochloric acid is refluxed for 72 hours. The resulting lower organopolysiloxane phase is washed four times with distilled water, then dried over anhydrous potassium carbonate and filtered. This results is a mixed methylvinylsiloxane oil containing both cyclic and linear methylvinylpolysiloxanes of varying chain lengths. This oil is distilled rapidly after the addition of 1 percent, by weight, of p-tert-butyl catechol as a polymerization inhibitor. The distillation is carried out at 0.5 mm. using a 12″ Vigreux column. The fraction boiling between 60 and 135° C. at 0.5 mm. is collected and after the addition of another one percent, by weight, of p-tert-butyl catechol the distillate is fractionated under reduced pressure in a ½″ by 16″ protruded-packed column. This fractionation yields (1) a fraction boiling at 111 to 112° C. at 10 mm., (2) a fraction boiling at 115 to 143° C. at 11 mm., and (3) a fraction boiling at 143 to 172.5° C. at 11 mm.

Fraction 1 corresponds to 1,3,5,7-tetramethyl-1,3,5,7-tetravinylcyclotetrasiloxane. Analysis of this compound shows it to contain 41.9 percent carbon, 7.2 percent H, 32.5 percent Si; to have a molecular weight of 346 by cryoscopic determination using a solution of 0.240 gram of the siloxane in 19.17 grams of cyclohexane, and a molar refractivity, $MR_D$ 90.93. Theoretical values are 41.8 percent carbon, 7.02 percent hydrogen, 32.6 percent silicon, molecular weight 344.7, $MR_D$ 91.20. Distillation of this compound in a small Vigreux column at atmospheric pressure without polymerization or decomposition shows its boiling point to be 224 to 224.5° C. at 758 mm.

Fraction 2 is washed with 25 ml. portions of 1 percent sodium carbonate until the p-tert-butyl catechol is removed (as evidenced by a negative ferric chloride test on the aqueous solution). The oil is dried over anhydrous potassium carbonate and distilled under reduced pressure in a ½″ x 16″ protruded-packed column. Distillation yields 1,3,5,7,9-pentamethyl-1,3,5,7,9-pentavinylcyclopentasiloxane at 145 to 146° C. at 13 mm. This compound is analyzed and found to contain 41.6 percent C, 7.2 percent H, and 32.8 percent Si, with a molecular weight of 437 and $MR_D$ 113.58. This compares to the theoretical values of 41.8 percent C, 7.02 percent H, 32.6 percent Si, with a molecular weight of 430.8 and $MR_D$ 114.00. This siloxane is distilled without polymerization or decomposition at 260 to 262° C. under 750 mm.

Fraction 3 is redistilled under reduced pressure in a ½″ x 16″ protruded-packed column to give pure 1,3,5,7,9,11-hexamethyl-1,3,5,7,9,11-hexavinylcyclohexasiloxane which boils between 160.5 and 161° C. at 5 mm. Analysis of this compound shows it to contain 41.3 percent C, 7.1 percent H, 31.3 percent Si, with a molecular weight of 536 and $MR_D$ 135.58. This compares with the theoretical values of 41.8 percent C, 7.02 percent H, and 32.6 percent Si, with a molecular weight of 517.0 and $MR_D$ 136.80. This compound is distilled at atmospheric pressure and found to have a boiling point of 296 to 297° C. at 750 mm. The boiling points, melting points, indices of refraction and densities of the three compounds isolated above are listed in Table I.

*Table I*

| Fraction | Siloxane | B. P., °C. | mm. | M. P., °C. | $n_D^{20}$ | $d_4^{20}$ |
|---|---|---|---|---|---|---|
| 1 | [(CH$_3$)(CH$_2$=CH)SiO]$_4$ | 111–12<br>224–224.5 | 10<br>758 | −43.5+0.1 | 1.4342 | 0.9875 |
| 2 | [(CH$_3$)(CH$_2$=CH)SiO]$_5$ | 145–146<br>261–262 | 13<br>758 | −140 to −136 | 1.4373 | 0.9943 |
| 3 | [(CH$_3$)(CH$_2$=CH)SiO]$_6$ | 160.5–161<br>172–172.5<br>296–297 | 5<br>11<br>758 | −123 to −119 | 1.4400 | 1.0050 |

EXAMPLE 2

The unfractionated oil, fraction 1, fraction 2 and fraction 3 of the products of Example 1 are treated with vaporous SCl$_2$. In each case a thin layer of the oil is painted on a flat surface (a piece of glass) which is exposed to the vapors. A resinous product is immediately formed. Thereupon a stream of air is passed over the resin to remove excess SCl$_2$.

EXAMPLE 3

A vinyl-containing organopolysiloxane gum is prepared by adding 3 parts, by weight, of 1,3,5,7,9-pentamethyl-1,3,5,7,9-pentavinylcyclopentasiloxane to 97 parts, by weight, of octamethylcyclotetrasiloxane and heating the mixture to 135° C. At this point 0.05 percent, by weight, of cesium hydroxide is added and the mixture polymerized to a gum within about 15 minutes. This vinyl-containing gum has the average structural formula $$(CH_2=CH)_{0.026}(CH_3)_{1.974}SiO$$

In a similar fashion, gums containing 2.0 to 4.0 percent, by weight, of 1,3,5,7,9-pentamethyl-1,3,5,7,9-pentavinylcyclopentasiloxane in octamethylcyclotetrasiloxane are prepared using amounts of cesium hydroxide as a polymerization catalyst which vary from about 0.001 to 0.5 percent and using polymerization temperatures from about 130 to 150° C. This results in vinyl-containing gums of the average structural formulas $$(CH_2=CH)_{0.017}(CH_3)_{1.983}SiO$$

and $$(CH_2=CH)_{.035}(CH_3)_{1.965}SiO$$

respectively.

EXAMPLE 4

A gum containing diphenyl siloxane units is prepared by the method of Example 3, for example, by adding 3 parts, by weight, of 1,3,5,7-tetramethyl-1,3,5,7-tetravinylcyclotetrasiloxane, 47 parts, by weight, of octamethylcyclotetrasiloxane, and 50 parts, by weight, of octaphenylcyclotetrasiloxane to a temperature of about 150° C. and adding about 0.05 percent, by weight, of cesium hydroxide based on the total weight of the organopolysiloxanes present. In a matter of 10 to 20 minutes a stiff gum is formed.

EXAMPLE 5

A gum is prepared by adding 10 parts, by weight, of 1,3,5,7-pentamethyl-1,3,5,7-pentavinylcyclopentasiloxane to 90 parts, by weight, of octamethylcyclotetrasiloxane and heating the mixture to about 150° C. At this time 0.05 percent, by weight, of cesium hydroxide are added and after 15 minutes a high molecular weight gum is obtained. This gum has the average structural formula $(CH_2=CH)_{0.087}(CH_3)_{1.913}SiO$.

EXAMPLE 6

A vinyl-containing gum is prepared by mixing 3 grams of 1,3,5,7-tetramethyl-1,3,5,7-tetravinylcyclotetrasiloxane prepared by the method of Example 1 with 97 grams of octamethylcyclotetrasiloxane and about .02 gram of tetrabutylphosphonium hydroxide. This mixture is heated to a temperature of about 110° C. and after about 15 minutes a high molecular weight gum is obtained.

EXAMPLE 7

The gums prepared in Examples 3 through 6 are dissolved in a suitable solvent (benzene, 50% solids) and applied to a suitable material (a piece of glass). The solvent is thereafter allowed to evaporate. The resulting film is thereupon exposed to vapors of SCl$_2$ to immediately form a resinous product. Excess SCl$_2$ is removed by a stream of air.

EXAMPLE 8

A cyclohexenyl polysiloxane is prepared by hydrolysing cyclohexenyl trichlorosilane. The resinous product is dissolved in toluene and SCl₂ is bubbled into solution to immediately precipitate a light yellow, brittle resin.

EXAMPLE 9

A toluene solution of cyclohexenyl polysiloxane (prepared in Example 8) is applied to a piece of glass and a thin film is produced by evaporating the solvent therefrom. This film is exposed to SCl₂ to produce a hard, brittle resin.

EXAMPLE 10

Non-SCl₂ treated xylene solutions containing 50% solids are prepared from the organopolysiloxanes prepared in Examples 3, 4, 5, 6, and 8. A separate copper wire is passed through each solution, the solvent is evaporated therefrom by heat, the coated wire is then passed through a SCl₂ chamber, and residual SCl₂ removed by a stream of air to produce an insulated wire.

In addition to the unsaturated organopolysiloxanes disclosed in the above examples, other unsaturated organopolysiloxanes can be used. Examples of suitable unsaturated vinyl-containing organopolysiloxanes are disclosed in Roedel—2,420,911, Marsden—2,445,794, Hurd—2,645,628, etc. It, of course, should be understood that in addition to the vinyl containing and cyclohexenyl containing organopolysiloxane disclosed above, allyllic, methallyllic, acetlylenic, polyunsaturates, etc. groups can also be employed. By controlling the amount of unsaturated groups present, one can produce a product having the desired toughness and flexibility.

In addition to oils and gums, organopolysiloxane resins containing more than 1.0 and less than 2, preferably from about 1.1–1.7 hydrocarbon radicals attached directly to silicon can be reacted with sulfur dichloride. These compositions can be cured after being applied to a surface as a solution and the solvent evaporated therefrom, or can be dissolved in the solvent and precipitated by contacting the solution with sulfur dichloride.

The polysiloxane resins of this type are described, for example, in U. S. Patents 2,258,218–222 of Eugene G. Rochow. The resins, which comprise a plurality of hydrocarbon-substituted silicon atoms linked by oxygen atoms are prepared, for example, by hydrolysis and condensation of a mixture of organosilicon halides. Such resins usually contain small amounts of silicon-bonded hydroxyl or alkoxy groups as a result of the method of hydrolyzing the intermediate silanes used to prepare the polysiloxane. The commercially useful products containing an average of more than one and less than two hydrocarbon radicals per silicon atom are soluble in many solvents and are converted to a hard, insoluble state when heated for comparatively long periods of time at elevated temperatures. Other examples of organopolysiloxane resins embraced within the scope of the present invention may be found described in Welsh Patent 2,449,572.

EXAMPLE 11

An organopolysiloxane resin is prepared by cohydrolyzing 45.7 parts methyltrichlorosilane, 38.7 parts of phenyl trichlorosilane and 15.6 parts dimethyldichlorosilane, in the manner described in Welsh and Holdstock Patent 2,661,348. The resin thus obtained in the form of 60 percent solids in xylene solution upon treatment with SCl₂ immediately precipitates from solution.

This solution is also painted on a piece of glass and the solvent evaporated therefrom. This film, upon treatment with SCl₂ forms a hard resin.

EXAMPLE 12

A mixture of chlorosilanes consisting of 59.4 mole percent of dimethyldichlorosilane, 22.8 mole percent of methyltrichlorosilane and 17.8 mole percent of silicon tetrachloride is hydrolyzed by adding a solution of 400 grams of these mixed silanes in 400 grams of methyl-isobutyl ketone to 1150 grams of water and cooled in an ice bath. The water is drawn off and the ketone solution diluted to a resin base content of 25% by the addition of the required amount of toluene.

This solution is painted on a piece of glass and the solvent evaporated therefrom. This film is treated with SCl₂ to yield a hard resin.

EXAMPLE 13

A silicone resin is prepared by cohydrolyzing a blend of 50 mole percent of methyltrichlorosilane, 30 mole percent of phenyltrichlorosilane and 20 mole percent of dimethyldichlorosilane with water in the presence of butyl alcohol. The resulting product is heat treated with a small amount of zinc octoate. A 50% solution of this product in xylene is prepared and painted on a piece of glass and the solvent evaporated therefrom. This film is treated with SCl₂ to yield a hard resin.

The resinous products of this invention can be used in any of the various applications in which organopolysiloxane resins have previously been used. For example, they may be used as electrical insulation, wire enamels, in the manufacture of paints, as impregnating and coating compositions for sheet material, etc.

What I claim as as new and desire to secure by Letters Patent of the United States is:

1. A process of curing an organopolysiloxane having the formula $$R_aH_bSiO_{\frac{4-(a+b)}{2}}$$

where the sum of $a+b$ is equal to 1 to 3, inclusive, $b$ has a value of from 0 to 1, inclusive, and R represents members selected from the class consisting of alkyl radicals, aryl radicals, haloaryl radicals, aralkyl radicals, cycloalkyl radicals, unsaturated cycloaliphatic hydrocarbon radicals, and unsaturated aliphatic hydrocarbon radicals, which process comprises contacting the said organopolysiloxane with sulfur dichloride.

2. A process of curing an organopolysiloxane having the formula $$R_aH_bSiO_{\frac{4-(a+b)}{2}}$$

where the sum of $a+b$ is equal to from 1 to 3, inclusive, $b$ has a value of from 0 to 1, inclusive, and R represents members selected from the class consisting of alkyl radicals, aryl radicals, haloaryl radicals, aralkyl radicals, cycloalkyl radicals, unsaturated cycloaliphatic hydrocarbon radicals, and unsaturated aliphatic hydrocarbon radicals, which process comprises contacting said organopolysiloxane at room temperature with sulfur dichloride.

3. The method of curing an organopolysiloxane gum in which the organic groups are methyl radicals and vinyl radicals which method comprises contacting said organopolysiloxane with sulfur dichloride.

4. The method of curing an organopolysiloxane gum in which the organic groups are methyl radicals, phenyl radicals, and vinyl radicals, which method comprises contacting said organopolysiloxane with sulfur dichloride.

5. The method of curing a methylpolysiloxane resin which comprises contacting said resin with sulfur dichloride.

6. The method of curing a methylphenylpolysiloxane resin which comprises contacting said resin with sulfur dichloride.

7. The method of coating a surface which comprises forming a film on said surface of an uncured organopolysiloxane having the formula $$R_aH_bSiO_{\frac{4-(a+b)}{2}}$$

where the sum of $a+b$ is equal to from 1 to 3, inclusive, $b$ has a value of from 0 to 1, inclusive, and R represents members selected from the class consisting of alkyl radicals, aryl radicals, haloaryl radicals, aralkyl radicals, cycloalkyl radicals, unsaturated cycloaliphatic hydrocarbon radicals, and unsaturated aliphatic hydrocarbon radicals, and subsequently exposing the resulting coated surface to the vapors of sulfur dichloride.

8. The method of making an insulated electrical conductor which comprises forming a solution of an organopolysiloxane having the formula $$R_aH_bSiO_{\frac{4-(a+b)}{2}}$$

where the sum of $a+b$ is equal to from 1 to 3, inclusive, $b$ has a value of from 0 to 1, inclusive, and represents members selected from the class consisting of alkyl radicals, aryl radicals, haloaryl radicals, aralkyl radicals, cycloalkyl radicals, unsaturated cycloaliphatic hydrocarbon radicals, and unsaturated aliphatic hydrocarbon radicals, applying said solution to a copper wire, evaporating the solvent from said solution, whereby a coating of the uncured organopolysiloxane is formed on said wire, contacting the surface of said coated wire with sulfur dichloride, and removing any residual sulfur dichloride from the resulting coated conductor.

References Cited in the file of this patent

UNITED STATES PATENTS

| | | |
|---|---|---|
| 2,445,794 | Marsden | July 27, 1948 |
| 2,454,759 | Safford | Nov. 30, 1948 |
| 2,557,928 | Atkinson | June 26, 1951 |
| 2,645,628 | Hurd | July 14, 1953 |